United States Patent
Yuan et al.

(10) Patent No.: US 11,817,963 B2
(45) Date of Patent: Nov. 14, 2023

(54) STREAMING SECONDARY DEVICE CONTENT TO DEVICES CONNECTED TO A WEB CONFERENCE

(71) Applicant: Zoom Video Communications, Inc., San Jose, CA (US)

(72) Inventors: Zheng Yuan, San Jose, CA (US); Hailei Sheng, San Jose, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/538,713

(22) Filed: Nov. 30, 2021

(65) Prior Publication Data

US 2022/0094563 A1    Mar. 24, 2022

Related U.S. Application Data

(63) Continuation of application No. 14/577,833, filed on Dec. 19, 2014, now abandoned.

(60) Provisional application No. 61/920,698, filed on Dec. 24, 2013.

(51) Int. Cl.
| | | |
|---|---|---|
| *H04L 65/60* | (2022.01) | |
| *H04L 12/18* | (2006.01) | |
| *H04L 65/1059* | (2022.01) | |
| H04L 65/1063 | (2022.01) | |

(52) U.S. Cl.
CPC ...... *H04L 12/1822* (2013.01); *H04L 65/1059* (2013.01); *H04L 65/60* (2013.01); *H04L 65/1063* (2013.01)

(58) Field of Classification Search
CPC ..... H04L 12/1822; H04L 65/55; H04L 65/60; H04L 65/70; H04L 65/75; H04L 65/1063; H04L 65/1013; H04L 65/1059
USPC .................. 709/220, 224, 226, 227, 228
See application file for complete search history.

(56) References Cited

U.S. PATENT DOCUMENTS

| | | |
|---|---|---|
| 7,558,823 B2 | 7/2009 | Beers et al. |
| 8,432,825 B2 | 4/2013 | Balasaygun et al. |
| 8,650,309 B2 | 2/2014 | Wang et al. |
| 8,754,926 B1 | 6/2014 | Gossweiler et al. |
| 8,868,658 B2 | 10/2014 | Liu et al. |
| 9,167,009 B2 | 10/2015 | Bastide et al. |
| 9,197,565 B2 | 11/2015 | Khanchi et al. |
| 9,257,097 B2 | 2/2016 | Subramaniam et al. |
| 9,258,339 B2 | 2/2016 | Bastide et al. |
| 9,673,953 B2 | 6/2017 | Becker Hof et al. |
| 9,699,271 B2 | 7/2017 | Brander et al. |
| 9,755,847 B2 | 9/2017 | Clavel et al. |
| 10,346,937 B2 | 7/2019 | Ford |

(Continued)

FOREIGN PATENT DOCUMENTS

| | | | | |
|---|---|---|---|---|
| CA | 2717504 A1 | * | 11/2009 | ........... G06F 17/289 |
| CA | 2632510 C | * | 9/2012 | ......... G06F 17/3089 |

Primary Examiner — Khanh Q Dinh
(74) Attorney, Agent, or Firm — Young Basile Hanlon & MacFarlane, P.C.

(57) ABSTRACT

In an embodiment, method and system includes initiating a web conferencing meeting, detecting a plurality of client devices for to participate in the web conferencing meeting, detecting a local source associated with one of the plurality of client devices, selecting from content from a local source to share with other client devices during the web conferencing meeting, and streaming the content from the local source through one of the plurality of client devices associated with the local source.

20 Claims, 5 Drawing Sheets

(56) References Cited

U.S. PATENT DOCUMENTS

| | | |
|---|---|---|
| 10,459,677 B2 | 10/2019 | Patel |
| 2007/0282994 A1 | 12/2007 | Beers et al. |
| 2008/0162635 A1 | 7/2008 | Keren |
| 2008/0305813 A1 | 12/2008 | Rao |
| 2009/0298478 A1* | 12/2009 | Tyhurst .................. H04W 4/50 455/414.1 |
| 2009/0300137 A1* | 12/2009 | Tyhurst .................. H04L 67/34 709/217 |
| 2009/0300596 A1* | 12/2009 | Tyhurst .................... G06F 8/65 717/173 |
| 2011/0307550 A1* | 12/2011 | Bastide .................. H04M 3/56 709/204 |
| 2011/0307805 A1* | 12/2011 | Bastide ............... H04L 12/1822 715/753 |
| 2011/0320958 A1* | 12/2011 | Kashi ................ G06Q 10/1095 715/751 |
| 2012/0089928 A1* | 4/2012 | Bryant ............... H04L 12/1827 715/753 |
| 2012/0233644 A1 | 9/2012 | Rao |
| 2012/0290950 A1 | 11/2012 | Rapaport et al. |
| 2012/0314018 A1* | 12/2012 | Wengrovitz ........... H04N 7/181 348/E7.083 |
| 2012/0331066 A1* | 12/2012 | FitzGerald ............ H04L 65/765 709/217 |
| 2013/0007635 A1* | 1/2013 | Michaelis ............... H04M 3/56 715/753 |
| 2013/0139071 A1 | 5/2013 | Hoff et al. |
| 2013/0305167 A1 | 11/2013 | Bastide et al. |
| 2013/0326070 A1 | 12/2013 | Wang et al. |
| 2013/0339431 A1* | 12/2013 | Yannakopoulos .......................... H04L 12/1831 709/204 |
| 2014/0006974 A1* | 1/2014 | Bell .................... H04L 12/1822 715/753 |
| 2014/0022956 A1* | 1/2014 | Ramalho ............... H04L 65/403 370/260 |
| 2014/0040360 A1* | 2/2014 | Privat ................... G06F 3/1423 709/204 |
| 2014/0215356 A1 | 7/2014 | Brander et al. |
| 2015/0179143 A1 | 6/2015 | Subramaniam et al. |
| 2017/0108997 A1* | 4/2017 | Kim ..................... G06F 40/143 |

\* cited by examiner

STREAMING SECONDARY DEVICE CONTENT TO DEVICES CONNECTED TO A WEB CONFERENCE

CROSS-REFERENCE TO RELATED APPLICATION(S)

This application claims priority to and the benefit of U.S. patent application Ser. No. 14/577,833, filed Dec. 19, 2014, which claims the benefit of priority to U.S. Provisional Patent Application No. 61/920,698, filed Dec. 24, 2013, the entire disclosure of which is hereby incorporated by reference.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Web conferencing between multiple participants through a network such as the internet is useful in communicating and sharing ideas even though participants are in remote locations. Some features of the web conferencing include document sharing, video sharing, screen sharing, and the like.

Participants of web conferencing session can use desktop computers, laptop computers, tablets, smart phones, and smart televisions as their endpoint devices. These endpoint devices can be utilized to display the graphical images from other participants and also utilized to transmit graphical images for display by other participants.

The ease of use of web conferencing encourages participant adoption and allows a participant to share many types of media with other participants.

SUMMARY

The appended claims may serve as a summary of the invention.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

In the drawings.

DETAILED DESCRIPTION

Figure 1:
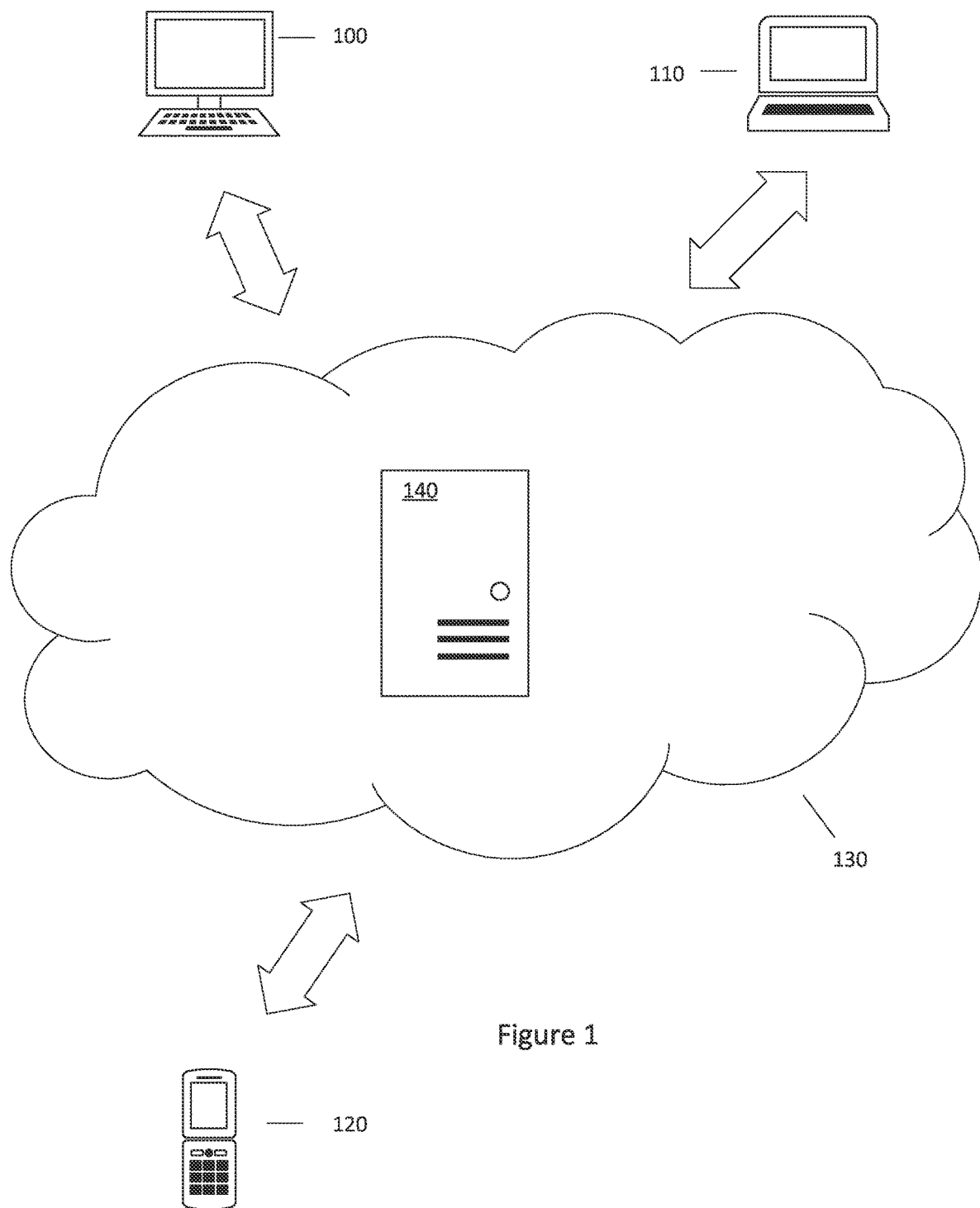
FIG. 1 illustrates a networked computer system with which an embodiment may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in sections below according to the following outline:
1. Overview
2. Direct Integration
3. Gateway
4. Example Embodiments
5. Example Implementation Mechanism—Hardware Overview

1. Overview

Sharing content within a computer screen is a basic and important feature in an online web conferencing software application. Mobile devices such as tablet PCs and smart phones are widely used in the workplace as well as at home. However, sharing content within the screen of a tablet PC/smart phone may not be available to a web conferencing meeting application running on the mobile device, due to a variety of reasons. For example, mobile devices often have limited operating systems and limited computing resources which make sharing the content with computer screen of the mobile device impractical. Accordingly, online meetings and their associated features may not be available on mobile devices.

A mobile device is usually equipped with a wireless streaming capability that enables streaming or transferring the audio, pictures, videos, and local screen content of the mobile device to another presentation device in real-time or near real-time. Some examples of such streaming protocols implemented in mobile devices include AirPlay, Miracast, Play To, and DLNA.

AirPlay is a streaming protocol defined by Apple to enable an airPlay sender, typically running on an iPod, iPad or iPhone. AirPlay is typically used to stream content such as audio, videos, photos and screen content from the sender device to an airPlay receiver which typically runs on an Apple TV.

Miracast is a wireless streaming protocol enabling peer-to-peer wireless screencast via Wi-Fi Direct connections. Implemented on Miracast certified desktop PCs, tablets PCs or smart phones, Miracast enables delivery of audio and video from a sending device to a receiving device. Many Android smart phones and Android based smart devices such as projector, smart TV are equipped with Miracast.

Play To is developed by Microsoft and makes it easy to stream music, videos, and photos from a Windows PC to another Windows PC or Windows compatible device such as TV, stereo, game console, tablet, smart phone on a home network.

Originally established by Sony, DLNA defines interoperability guidelines to enable sharing of digital media between multimedia devices such as TV, PC, tablet, smart phone, etc. A DLNA compatible device connects to another in a home network through the UPnP (Universal Plug and Play) protocol. The connection enables playing any media such as audio, video and pictures from the DLNA server (sender) onto the DNLA client (receiver/renderer).

FIG. 1 illustrates a networked computer system with which an embodiment may be implemented. In one approach, a server computer 140 is coupled to a network 130, which is also coupled to client computers 100, 110, 120. For purposes of illustrating a clear example, FIG. 1 shows a limited number of elements, but in practical embodiments there may be any number of certain elements shown in FIG. 1. For example, the server 140 may represent an instance among a large plurality of instances of the application server in a data center, cloud computing environment, or other mass computing environment. There also may include thousands or millions of client computers.

In an embodiment, the server computer 140 hosts a video conferencing meeting and transmits and receives video, image, and audio data to and from each of the client computers 100, 110, 120.

Each of the client computers 100, 110, 120 comprises a computing device having a central processing unit (CPU), graphics processing unit (GPU), one or more buses, memory organized as volatile and/or nonvolatile storage, one or more data input devices, I/O interfaces and output devices such as loudspeakers or a LINE-OUT jack and associated drivers. Each of the client computers 100, 110, 120 may include an integrated or separate display unit such as a computer screen, TV screen or other display. Client computers 100, 110, 120 may comprise any of mobile or stationary computers including desktop computers, laptops, netbooks, ultrabooks, tablet computers, smartphones, etc. Typically the GPU and CPU each manage separate hardware memory spaces. For example, CPU memory may be used primarily for storing program instructions and data associated with application programs, whereas GPU memory may have a high-speed bus connection to the GPU and may be directly mapped to row/column drivers or driver circuits associated with a liquid crystal display (LCD) that serves as the display. In one embodiment, the network 130 is the Internet.

Each of the client computers 100, 110, 120 hosts, in an embodiment, an application that allows each of the client computers 100, 110, 120 to communicate with the server computer 140. In an embodiment, the server 140 may maintain a plurality of accounts, each associated with one of the client computers 100, 110, 120 and/or one or more users of the client computers.

2. Direct Integration

In one embodiment, the streaming receiver is tightly integrated into a web conferencing client for use in a web conferencing meeting application. In this embodiment, a primary device is connected with the web conferencing meeting and a secondary device is associated with the primary device. In one embodiment, the secondary device is a mobile device which is capable of transmitting content in the form of a screen shot to the primary device. In one embodiment, the primary device seamlessly shares the content from the secondary device with other participants of the web conference. In use, the content from the screen of the secondary device is transmitted to other participants of the web conference as if the screen content from the secondary device is coming from the primary device. The mobile device screen is considered as one of the applications which, if selected, can be shared out by the meeting client.

Figure 2:
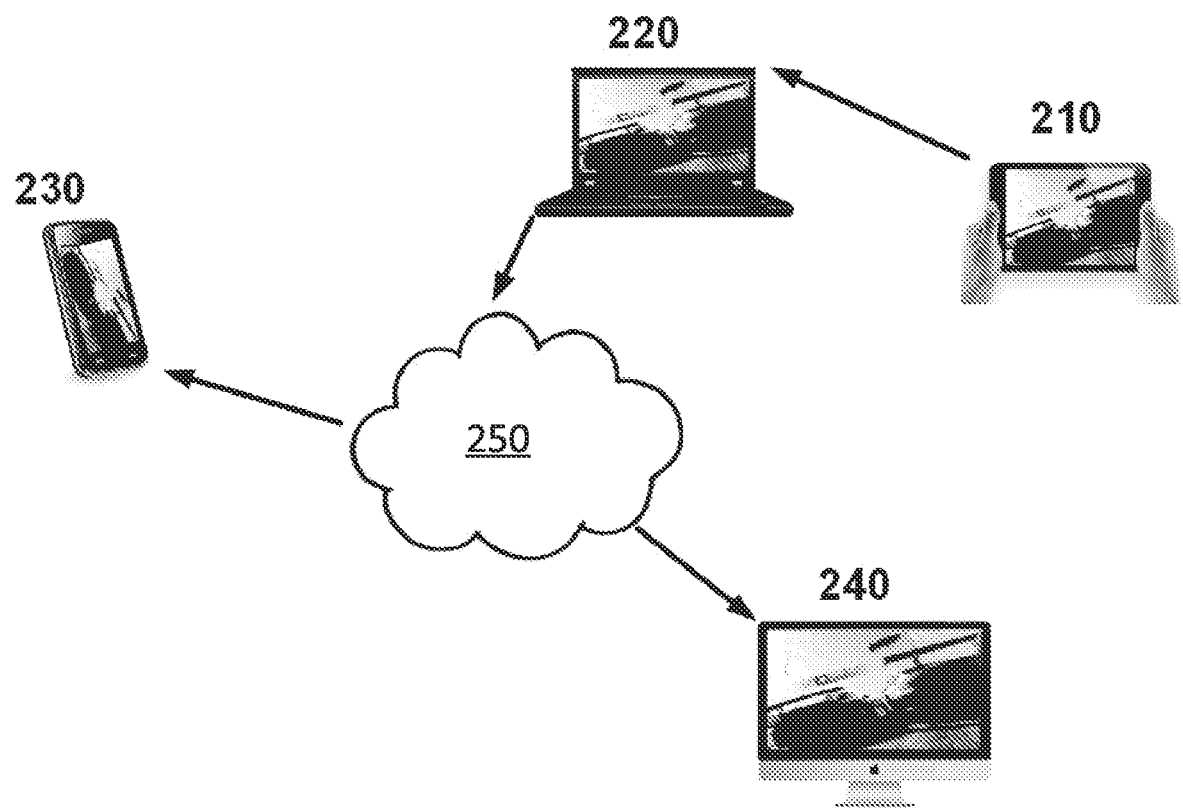
FIG. 2 illustrates a block diagram according to an embodiment.

FIG. 2 illustrates a block diagram showing exemplary web conferencing architecture. In this embodiment, meeting client devices 220, 230 and 240 are participants engaged in a web conferencing session through a network 250. In one embodiment, the screen of a mobile device 210 is shared to meeting client devices 220, 230 and 240. The streaming receiver on the meeting client device 220 is built into the meeting client and configured to receive data from a remote device such as the mobile device 210. In this embodiment, when the screen of the mobile device 210 is streamed to the meeting client device 220, the web conferencing application running within the meeting client device 220 detects the data which in this case is the screen data of the mobile device 210. Further, the meeting client device 220 transmits and shares the screen data of the mobile device 210 to meeting client devices 230 and 240 through regular meeting sharing capability within the web conferencing session.

In this embodiment, the mobile device 210 acts as a peripheral device to the meeting client device 220 instead of an independent meeting client. One of the motivations to have the mobile device 210 share through the meeting client device 220 instead of sharing directly with meeting client devices 230 and 240 is that the mobile device A may not have enough processing or memory capacity to operate the web conferencing application to participate directly in the web conferencing session.

3. Gateway

In one embodiment, the streaming receiver which is configured to detect and receive data from another device is implemented as a part of a virtual meeting client which is considered a gateway to the on-line meeting. The mobile device screen is considered as the to-be-shared screen of the virtual meeting client.

Figure 3:
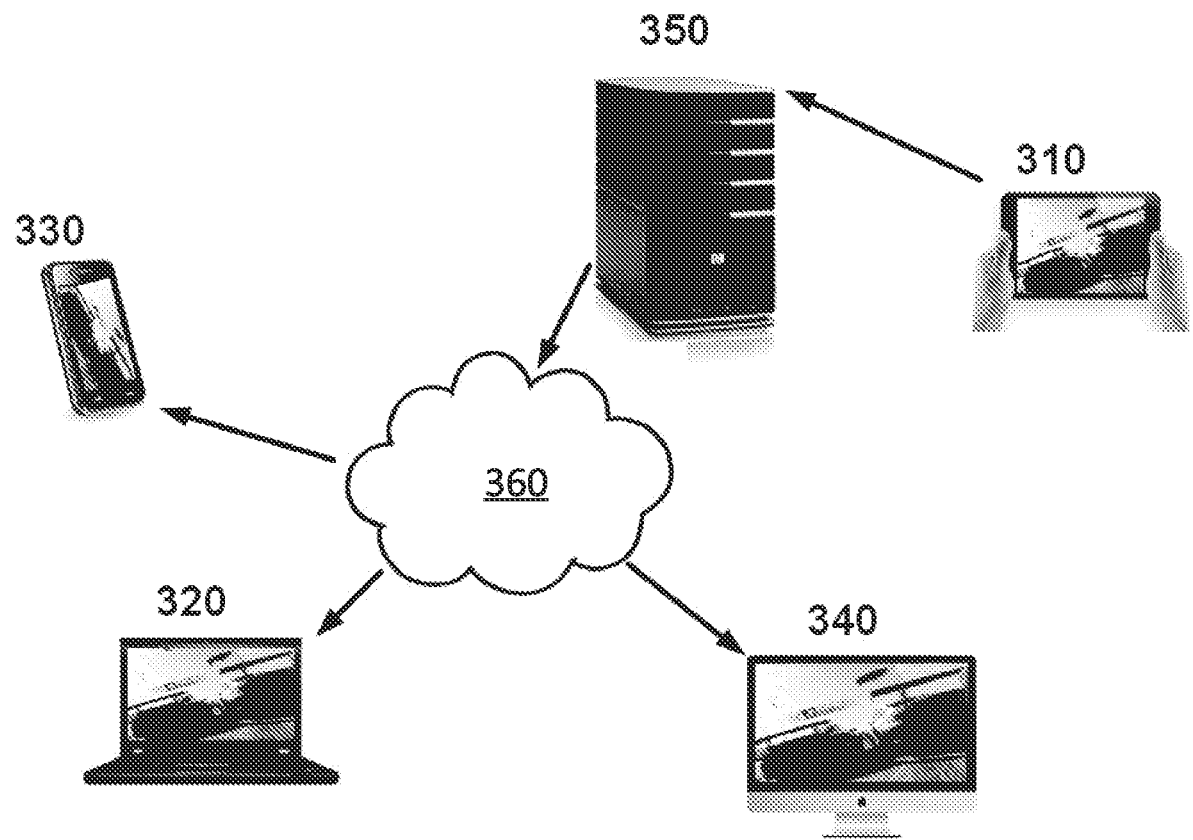
FIG. 3 illustrates a block according to an embodiment.

FIG. 3 illustrates a block diagram with an exemplary architecture in which the screen of mobile device 310 is shared to meeting client devices 320, 330 and 340 through a meeting gateway 350. In one embodiment, mobile device 310 and meeting client devices 320, 330, and 340 are engaged in a web conferencing session through network 360. In one embodiment, a virtual meeting client is running on gateway 250 which also acts as a streaming receiver to detect and transmit data streamed from mobile device 310. When the screen of the mobile device 310 is streamed to Gateway 350, the virtual meeting client running on gateway 350 detects and transmits the data and shares it out to meeting client devices 320, 330, and 340 using regular meeting sharing capability.

In this architecture, mobile device 310 acts as an independent meeting client and gateway 350 is not visible to other meeting clients such as clients 320, 330, and 340. The gateway 350 can be a Windows PC, Mac, iPad, iPhone or Android device, etc.

4. Example Embodiments

Figure 4:
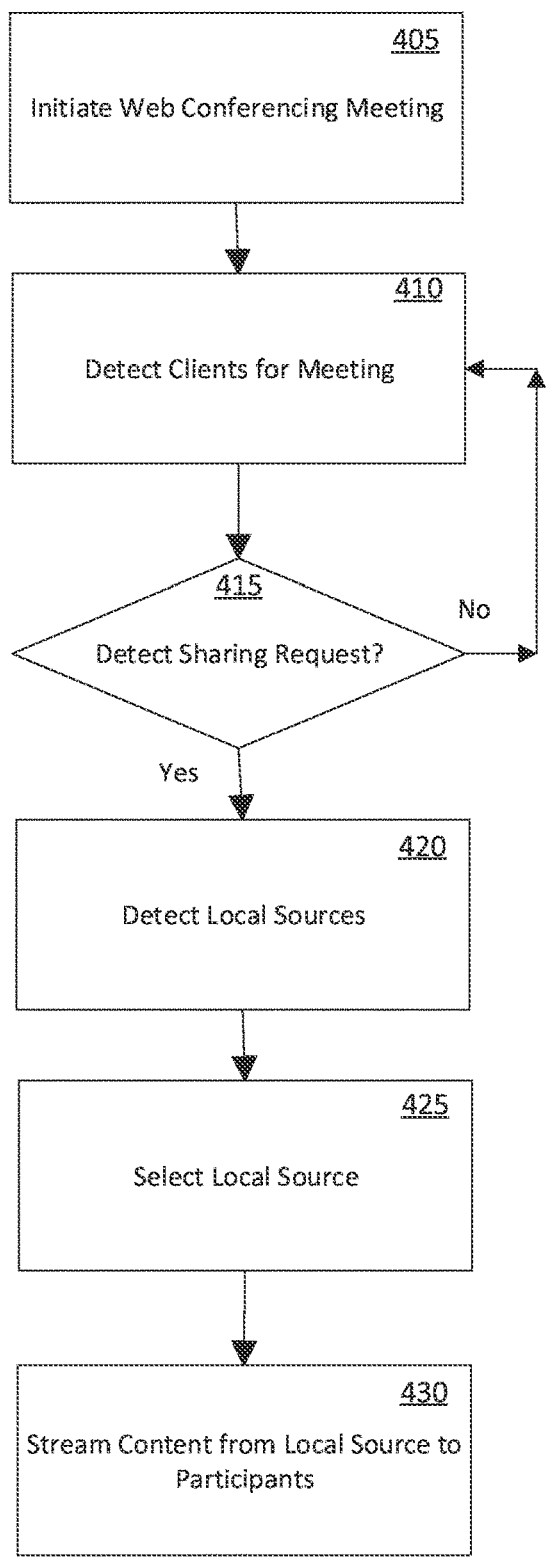
FIG. 4 illustrates a flow diagram according to an embodiment.

FIG. 4, shown below, illustrates a flow diagram that describes various embodiments with streaming content during web a conferencing meeting from a mobile device. Functional blocks are utilized within the flow diagram to demonstrate different aspects; functional blocks may be combined, divided, or removed without narrowing the scope of the embodiments.

In Block 405, a web conferencing meeting is initiated. In one embodiment, the web conferencing meeting allows participants to share their respective screens and content with other participants. The participants may be in remote locations and communicate through a network such as the internet. In one embodiment, the web conferencing meeting is hosted through the server 140 (shown in FIG. 1).

In Block 410, client devices are detected within the web conferencing meeting. In one embodiment, each of the client devices can be a computer, a tablet, a smartphone, or any network accessible device capable of receiving information and displaying information.

In Block 415, requests to share data are detected at each client device associated with the web conferencing meeting. In one embodiment, the web conferencing application runs on each of the client devices.

In Block 420, if there is a request to share data at a client device, the local content sources are detected for this client device. For example, if the client device is a computer and the client device wishes to share content such as screen sharing, document sharing and the like, the local sources available to this computer are displayed. Local sources associated with this computer can include a webcam coupled to the computer, on-line storage accessible and controlled by the computer, data stored on the computer, mobile devices associated with the computer through DNLA, AirPlay, Miracast or Play To, and other peripheral devices associated with the computer. In another embodiment, local content sources can also include wireless devices located within the proximity of the computer. In this embodiment, an authentication process is utilized to grant permission from the wireless device to be utilized by the computer as a local source.

In one embodiment, the local content sources available to the client device are presented through the client device as potential content source choices. For example, if a smartphone is available as a local content source and photographs are also available stored locally on the computer, then both the smartphone and locally stored photographs are presented as potential content sources for the web conferencing meeting through the client device. In another embodiment, the specific content that is available through the smartphone is individually presented as potential content source choices.

In another embodiment, instead of having the client device being a computer, the client device is a gateway which participates in the web conferencing meeting as a pass through for an associated mobile device. In this embodiment, other meeting participants see the mobile device as the participant even though the gateway is the client device running the web conferencing meeting application.

In Block 425, one of the local content sources is selected to be shared by the client device with other participants of the web conferencing meeting.

In Block 430, the content from the selected local content source is streamed through the client device and is available to other participants (other client devices) of the on-line meeting. In one instance, when a mobile device utilized as a local content source for a client device, this mobile device is capable of streaming any of the content that is available on this mobile device. For example, content available on the mobile device that is available for streaming include and are not limited to: audio content, video content, photographs, text messages, documents, and emails. In another embodiment, video or audio recorded in real-time or near real-time on a mobile device can be streamed through the client device such that the mobile device acts as a wireless webcam or audio recorder for the client device.

5. Example Implementation Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
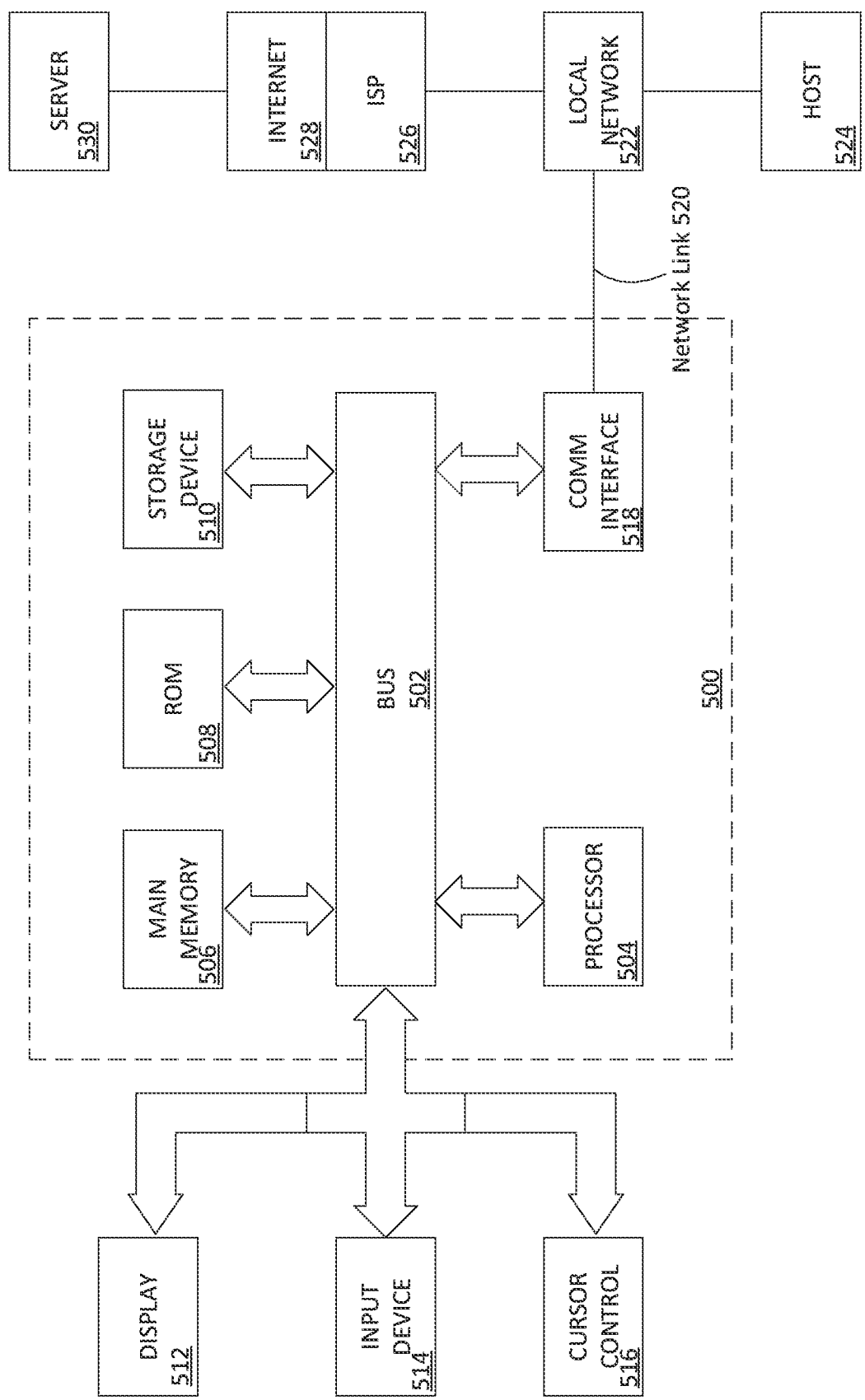
FIG. 5 illustrates a computer system with which an embodiment may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 1002. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 1004 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:
   initiating, by a client application running on a primary device connected to a web conference, a detection of secondary devices that are potential sources of sharable content available for streaming on the web conference;
   receiving, by the client application, an indication of one of the secondary devices to use for streaming content on the web conference; and
   streaming, from the primary device without the secondary device connecting to the web conference, the content of the secondary device on the web conference to one or more other devices connected to the web conference via a wireless network between the secondary device and the primary device, wherein the secondary device is invisible to the one or more other devices.

2. The method of claim 1, wherein streaming the content of the secondary device on the web conference to the one or more other devices comprises:
   indicating to the one or more other devices that the content of the secondary device is streamed from the primary device.

3. The method of claim 1, comprising:
   receiving, by the client application, a selection of the content from a set of content available at the secondary device.

4. The method of claim 1, comprising:
   performing an authentication process to enable the primary device to access the content of the secondary device.

5. The method of claim 1, wherein the detection of the secondary devices is initiated responsive to a request to share data.

6. The method of claim 1, wherein the indication of the secondary device is received based on a presentation of the secondary devices for selection at the primary device.

7. The method of claim 1, wherein the content is screen share content output at a display of the secondary device.

8. A non-transitory computer readable medium storing instructions operable to cause one or more processors to perform operations comprising:
   initiating a detection of secondary devices that are potential sources of sharable content available for streaming on a web conference to which a primary device is connected;
   receiving an indication of one of the secondary devices to use for streaming content on the web conference; and
   streaming, from the primary device without the secondary device connecting to the web conference, the content of the secondary device on the web conference to one or more other devices connected to the web conference via a wireless network between the secondary device and the primary device, wherein the secondary device is invisible to the one or more other devices.

9. The non-transitory computer readable medium of claim 8, the operations comprising:
detecting a request to share content from a device connected to the web conference.

10. The non-transitory computer readable medium of claim 8, the operations comprising:
detecting local content sources based on a request to share content on the web conference, wherein the local content sources include the secondary devices and one or more media items stored at the primary device.

11. The non-transitory computer readable medium of claim 8, the operations comprising:
presenting the secondary devices for selection at the primary device responsive to the detection of the secondary devices.

12. The non-transitory computer readable medium of claim 8, wherein the content of the secondary device is indicated to the one or more other devices as being streamed from the primary device.

13. The non-transitory computer readable medium of claim 8, wherein access to the content of the secondary device at the primary device is enabled based on an authentication process.

14. The non-transitory computer readable medium of claim 8, wherein the primary device is a laptop computer or a desktop computer and the secondary device is a tablet computer or a smart phone.

15. An apparatus, comprising:
a network interface configured to connect to a web conference over a first network and to connect to a secondary device over a second network;
a memory storing instructions associated with a client application; and
a processor configured to execute the instructions to:
initiate a detection of secondary devices that are potential sources of sharable content available for streaming on the web conference;
receive an indication of one of the secondary devices to use for streaming content on the web conference; and
stream, from the primary device without the secondary device connecting to the web conference, the content of the secondary device on the web conference to one or more other devices connected to the web conference via the second network, wherein the secondary device is invisible to the one or more other devices.

16. The apparatus of claim 15, wherein the content of the secondary device is indicated to the one or more other devices as being streamed from the primary device.

17. The apparatus of claim 15, wherein the detection of the secondary devices is initiated responsive to a request to share data.

18. The apparatus of claim 15, wherein access to the content of the secondary device at the primary device is enabled based on an authentication process.

19. The apparatus of claim 15, wherein the content includes one or more of audio content, video content, photographs, text messages, documents, or emails.

20. The apparatus of claim 15, wherein the second network is a wireless network configured for local device communication.

* * * * *